United States Patent [19]

Kawanaka et al.

[11] Patent Number: 5,280,080
[45] Date of Patent: Jan. 18, 1994

[54] ACRYLIC COPOLYMER ELASTOMER AND VULCANIZABLE COMPOSITION CONTAINING SAME

[75] Inventors: Takafumi Kawanaka; Kiyoshi Hosoya, both of Yokohama, Japan

[73] Assignee: Nippon Zeon Co., Ltd., Tokyo, Japan

[21] Appl. No.: 22,352

[22] Filed: Feb. 25, 1993

Related U.S. Application Data

[62] Division of Ser. No. 953,135, Sep. 29, 1992, Pat. No. 5,216,101.

[30] Foreign Application Priority Data

Sep. 30, 1991 [JP] Japan .................. 276317/91

[51] Int. Cl.$^5$ .................................. C08F 8/34
[52] U.S. Cl. ..................... 525/329.8; 525/330.2
[58] Field of Search ................. 525/329.8, 330.2

[56] References Cited

FOREIGN PATENT DOCUMENTS

| | | | |
|---|---|---|---|
| 0115081 | 8/1984 | European Pat. Off. | 526/320 |
| 0155805 | 9/1985 | European Pat. Off. | 526/320 |
| 0190892 | 8/1986 | European Pat. Off. | 526/320 |
| 3311752 | 10/1984 | Fed. Rep. of Germany | 526/320 |
| 59-181301 | 10/1984 | Japan | 526/320 |
| 60-143763 | 7/1985 | Japan | 526/320 |
| 1-126348 | 5/1989 | Japan | 526/320 |
| 2-289605 | 11/1990 | Japan | 526/320 |
| 3-239709 | 10/1991 | Japan | 526/320 |

*Primary Examiner*—Joseph L. Schofer
*Assistant Examiner*—N. Sarafin
*Attorney, Agent, or Firm*—Sherman and Shalloway

[57] ABSTRACT

There are provided an acrylic copolymer elastomer containing an acrylic acid polyalkylene glycol ester as a constituent, and a vulcanizable composition comprising said elastomer and a vulcanizing agent, which composition gives a vulcanizate excellent in cold resistance, heat resistance and oil resistance. The acrylic copolymer elastomer is obtained by copolymerizing (a) 45 to 89.9% by weight of a monomer represented by the formula

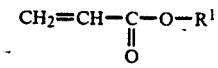

wherein $R^1$ denotes an alkyl group having 1 to 8 carbon atoms, and/or a monomer represented by the formula

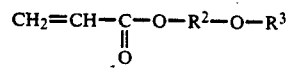

wherein $R^2$ denotes an alkylene group having 1 to 8 carbon atoms, and $R^3$ denotes an alkyl group having 1 to 8 carbon atoms, (b) 10 to 45% by weight of a monomer represented by the formula

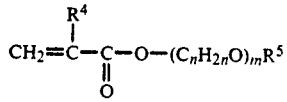

wherein $R^4$ denotes a hydrogen atom or a methyl group, $R^5$ denotes a hydrocarbon group having 1 to 8 carbon atoms, m is an integer of 2 to 10, and n is an integer of 2 to 3, (c) 0.1 to 10% by weight of a crosslinkable monomer, and (d) 0 to 30% by weight of a monoethylenically unsaturated monomer copolymerizable with components (a), (b) and (c).

5 Claims, No Drawings

ACRYLIC COPOLYMER ELASTOMER AND VULCANIZABLE COMPOSITION CONTAINING SAME

This is a division of application Ser. No. 07/953,135 filed Sep. 29, 1992 U.S. Pat. No. 5,216,101.

This invention relates to an acrylic polymer elastomer and a vulcanizable composition containing same. More specifically, this invention relates to an acrylic copolymer elastomer containing an acrylic acid polyalkylene glycol ester as a constituent and a vulcanizable composition comprising said elastomer and a vulcanizing agent, which composition gives a vulcanizate having oil resistance, heat resistance and cold resistance and suitable for use as an industrial material.

Acrylic elastomers are polymer elastomers composed mainly of acrylic acid esters and are generally known as rubbers excellent in heat resistance, oil resistance and ozone resistance. They are used as molding materials of oil seals, O-rings, packings, and the like.

In recent years, with higher performance of automobiles, levels of heat resistance, oil resistance and cold resistance of the existing rubber materials cannot meet the required performance, and development of rubbers having still higher performance has been demanded.

In order to improve the properties of the rubbers, principally the monomer composition, the amounts and the types of ingredients, and the like have been changed, but it has been impossible to satisfy all the requirements of heat resistance, oil resistance and cold resistance.

For instance, as a method to improve cold resistance without impairing heat resistance and oil resistance, there is a method in which ethyl acrylate is copolymerized with a certain (meth)acrylic acid ester (Japanese Laid-open Patent Application (Kokai) Nos. 264612/1988, 123809/1989, 132611/1989, 135811/19897 299808/1989 and 22313/1990). In this method, however, cold resistance does not well balance with oil resistance, and there is a problem with compression set.

It is an object of this invention to remedy these defects associated with the prior art.

The present inventors have made assiduous studies to achieve the above object, and consequently have found that an acrylic polymer elastomer containing a certain acrylic ester is improved in cold resistance without impairing good heat resistance and oil resistance inherent therein and is excellent in balance between cold resistance and oil resistance.

Thus, in accordance with this invention, there are provided [I] an acrylic copolymer elastomer obtained by copolymerizing (a) 45 to 89.9% by weight of a monomer represented by the formula

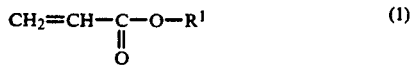  (1)

wherein $R^1$ denotes an alkyl group having 1 to 8 carbon atoms,
and/or a monomer represented by the formula

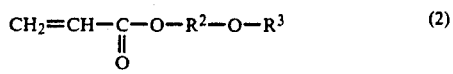  (2)

wherein $R^2$ denotes an alkylene group having 1 to 8 carbon atoms, and $R^3$ denotes an alkyl group having 1 to 8 carbon atoms, (b) 10 to 45% by weight of a monomer represented by the formula

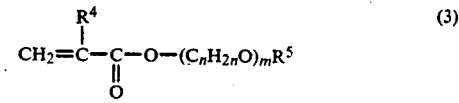  (3)

wherein $R^4$ denotes a hydrogen atom or a methyl group, $R^5$ denotes a hydrocarbon group having 1 to 8 carbon atoms, m is an integer of 2 to 10, and n is an integer of 2 to 3, (c) 0.1 to 10% by weight of a crosslinkable monomer, and (d) 0 to 30% by weight of a monoethylenically unsaturated monomer copolymerizable with components (a), (b) and (c), said elastomer having Mooney viscosity [$ML_{1+4}$, 100° C.] of 10 to 100, preferably 15 to 70, and [II] an acrylic copolymer elastomer vulcanizable composition comprising said elastomer, a vulcanizing agent and a vulcanizing agent auxiliary.

Among the monomers as component (a) used in this invention, the monomer represented by formula (1) is an alkyl acrylate having 1 to 8 carbon atoms, preferably 2 to 4 carbon atoms. Examples of said monomer are methyl acrylate, ethyl acrylate, propyl acrylate, butyl acrylate, hexyl acrylate, cyclohexyl acrylate and octyl acrylate.

The monomer represented by formula (2) is an alkoxyalkyl acrylate containing an alkoxy group having 1 to 8 carbon atoms. Examples of said monomer are methoxymethyl acrylate, methoxyethyl acrylate, ethoxyethyl acrylate and butoxyethyl acrylate.

The amount of the alkyl acrylate or the alkoxy-alkyl acrylate is 45 to 89.9% by weight, preferably 60 to 89.9% by weight based on the total weight of the monomer units. When the alkyl acrylate and the alkoxy-alkyl acrylate are conjointly used, it is advisable that the amount of the alkoxyalkyl acrylate is 20 to 50% by weight.

Examples of the monomer as component (b), i.e., the monomer represented by formula (3) used in this invention are ethoxydiethylene glycol (meth)acrylate, methoxydipropylene glycol (meth)acrylate, methoxytriethylene glycol (meth)acrylate, methoxyoctaethylene glycol (meth)acrylate, methoxytetraethylene glycol (meth)acrylate, and methoxynonaethylene glycol (meth)acrylate. Especially preferable are those having 2 to 4 alkylene glycol units.

The amount of said monomer is 10 to 45% by weight, preferably 10 to 35% by weights based on the total weight of the monomer units. When it is less than 10% by weight, an effect of improvement in cold resistance is not provided. When it is more than 40% by weight, heat resistance and tensile strength decrease.

Examples of the crosslinkable monomer as component (c) in this invention are an active chlorine-containing unsaturated monomer, an epoxy group-containing monomer, a carboxyl group-containing monomer and a diene monomer.

Examples of the active chlorine-containing unsaturated monomer are vinyl chloroacetate, vinylbenzyl chloride, allyl chloroacetate, vinyl chlorobutyrate, 2- chloroethyl acrylate, 3-chloropropyl acrylate, 4-chlorobutyl acrylate, 2-chloroethyl methacrylate, 2-chloroethylvinyl ether, chloromethylvinyl ketone, 1-chloro-2-butenyl acrylate, 5-chloromethyl-2-norbornene, 5-chloroacetoxymethyl-2-norbornene, and 5-(alpha,beta-dichloropropionylmethyl)-2-norbornene.

Examples of the epoxy group-containing monomer are unsaturated glycidyl esters such as glycidyl acrylate, glycidyl methacrylate, diglycidyl itaconate, triglycidyl butenetricarboxylate, and glycidyl p-styrenecarboxylate; and unsaturated glycidyl ethers such as vinylglycidyl ether, allylglycidyl ether, and methacrylglycidyl ether.

Examples of the carboxyl group-containing monomer are unsaturated carboxylic acids such as acrylic acid, methacrylic acid, itaconic acid, maleic acid, fumalic acid, 2-norbornene-5-carboxylic acid, maleic anhydride, and monomethyl maleate.

Examples of the diene monomer are butadiene, isoprene, cyclopentadiene, methylcyclopentadiene, ethylidene norbornene, and vinylidene norbornene.

These crosslinkable monomers can be used either singly or in combination. The amount of the crosslinkable monomer is 0.1 to 10% by weight, preferably 0.5 to 5% by weight based on the total weight of components (a), (b), (c) and (d). When said amount is less than 0.1 % by weight, a sufficient crosslinking effect is not provided. When it exceeds 10% by weight, strength and elongation of the resulting acrylic copolymer elastomer vulcanizate notably decrease.

The monoethylenically unsaturated monomer as component (d) used in this invention is an optional component used if required to improve mechanical characteristics and oil resistance of the obtained acrylic copolymer rubber. Examples thereof are monovinyl monomers such as acrylonitrile, vinyl acetate, styrene, alpha-methylstyrene, acrylamide, vinyl chloride, and acrylic acid; and monovinylidene monomers such as methyl methacrylate, ethyl methacrylate, methaerylonitrile, and vinylidene chloride. The amount of the monoethylenically unsaturated monomer is 30% by weight or less based on the total weight of the monomer units.

The polymerization reaction can be performed by polymerizing the monomer mixture through a known method such as emulsion polymerization, suspension polymerization, solution polymerization or bulk polymerization using an ordinary radical initiator. Said polymerization reaction may be conducted either batchwise or by adding one or more monomer components continuously or intermittently during the polymerization. The polymerization temperature is −10° C. to 100° C., preferably 2° to 80° C.

The vulcanizable composition of this invention is prepared by mixing the above obtained acrylic elastomer with a vulcanizing agent and a vulcanizing agent auxiliary.

A vulcanizing agent ordinarily used about the known acrylic elastomer containing the above crosslinkable monomer as a copolymerizable component is available as the vulcanizing agent. Examples of the vulcanizing agent are a combination of sulfur or a sulfur donor and an aliphatic acid metal soap or a combination of a dithiocarbamic acid salt or its derivative and trithiocyanuric acid in case of the elastomer containing the active chlorine group-containing unsaturated monomer as a copolymerizable component, a combination of ammonium benzoate, a dithiocarbamic acid salt, a combination of an isocyanuric acid and an onium salt in case of the elastomer containing the epoxy group-containing monomer as a copolymerizable component, a combination of a polyepoxy compound and an onium salt in case of the elastomer containing the carboxyl group-containing monomer as a copolymerizable component, and a sulfur vulcanizing agent or an organic peroxide vulcanizing agent in case of the elastomer containing the diene monomer as a copolymerizable component.

The acrylic copolymer elastomer of this invention can contain various additives commonly used in the rubber industry, such as a reinforcing agent, a filler, a plasticizer and an antioxidant.

The curing temperature of the elastomer is about 140° to 220° C. It is desirous that the vulcanizing temperature is about 160° to 200° C. Although the vulcanizing time depends on the vulcanizing temperature, it is generally 30 seconds to 20 minutes.

The vulcanizate made of the vulcanizable composition containing the acrylic polymer elastomer in this invention improves cold resistance that the ordinary acrylic copolymer rubber did not well satisfy, to a practical level, while maintaining good heat resistance, oil resistance and ozone resistance which are merits of the acrylic copolymer rubber; said vulcanizate has performance especially excellent in balance between oil resistance and cold resistance. Accordingly, the vulcanizable composition of this invention is useful in many fields requiring heat resistance, oil resistance, ozone resistance and cold resistance. Examples thereof are rubber parts such as gaskets, hoses, conveyor belts, packings, bearing seals, and oil seals.

The following Examples and Comparative Examples illustrate this invention more specifically. In said Examples, parts and percents are all by weight unless otherwise indicated.

EXAMPLES 1 to 6 and COMPARATIVE EXAMPLES 1 to 3

A 2-liter separable flask was fitted with a thermometer, a stirrer, a nitrogen introducing tube and a pressure reducing device, and a mixture of monomers shown in Table 2 was polymerized in accordance with polymerization recipes (I) and (II) shown in Table 1. Namely, the components indicated in the polymerization recipe (I) were first charged in the flask, and pH of the mixture in the flask was then adjusted to 7. With stirring, the temperature inside the system was adjusted to 50° C., and deaeration and nitrogen purging were repeated to thoroughly remove oxygen in the system. Thereafter, the components indicated in the polymerization recipe (II) were added to start polymerization. The polymerization temperature was 5° C. and the reaction time was about 16 hours. Polymerization conversion was 94 to 98%. After the polymerization was over, the polymerization product was precipitated, well washed with water, and then dried for 24 hours with a vacuum dryer to afford a final acrylic polymer elastomer.

TABLE 1

| (Polymerization recipe) | |
|---|---|
| | (g) |
| (I) Water | 1000 |
| Sodium dodecylbenzenesulfonate | 20 |
| Sodium naphthalenesulfonate | 10 |
| Sodium sulfate | 3 |
| Tetrasodium ethylenediaminetetraacetate | 0.2 |
| Sodium ferric ethylenediaminetetraacetate | 0.005 |
| Monomer mixture (Table 2) | 1000 |

TABLE 1 -continued
(Polymerization recipe)

| | (g) |
|---|---|
| (II) Na$_2$S$_2$O$_4$ | 0.2 |
| Sodium formaldehyde sulfoxylate | 0.2 |
| p-Menthane hydroperoxide | 0.1 |

TABLE 2
(Monomer composition)

| Monomer composition | Acrylic copolymer elastomer | | | | | | | | |
|---|---|---|---|---|---|---|---|---|---|
| | A | B | C | D | E | F | G | H | I |
| Ethyl acrylate | — | — | — | 6.3 | — | 6.3 | 35.0 | 5.0 | 5.0 |
| Butyl acrylate | 47.1 | 41.1 | 41.4 | 37.4 | 41.1 | 37.4 | 35.0 | 25.1 | 52.0 |
| Methoxyethyl acrylate | 31.4 | 27.4 | 32.1 | 24.8 | 27.4 | 24.8 | 23.5 | 18.4 | 41.5 |
| Polyethylene glycol acrylate | 20.0*[1] | 30.0*[1] | 25.0*[1] | 30.0*[1] | 30.0*[2] | 30.0*[2] | 5.0*[1] | 50.0*[1] | — |
| Vinyl chloroacetate | 1.5 | 1.5 | 1.5 | 1.5 | 1.5 | 1.5 | 1.5 | 1.5 | 1.5 |

*[1] Methoxytriethylene glycol acrylate
*[2] Ethoxydiethylene glycol acrylate

Using the thus obtained acrylic copolymer elastomers, blends were prepared according to a blending recipe shown in Table 3.

TABLE 3
(Blending recipe)

| | (parts by weight) |
|---|---|
| Acrylic copolymer elastomer | 100 |
| Stearic acid | 1 |
| MAF carbon | 60 |
| Sodium stearate | 3 |
| Potassium stearate | 0.5 |
| Sulfur | 0.25 |

The blending was conducted in an open roll heated at 50° to 60° C. The obtained blends were press-vulcanized at 170° C. for 20 minutes, and further heat-treated in a gear oven at 170° C. for 4 hours. The resulting vulcanizates were measured for vulcanization characteristics according to JISK-6301. The results are shown in Table 4.

TABLE 4

| | (Vulcanization properties) | | | | | | | | |
|---|---|---|---|---|---|---|---|---|---|
| | Ex. 1 | Ex. 2 | Ex. 3 | Ex. 4 | Ex. 5 | Ex. 6 | CEx. 1 | CEx. 2 | CEx. 3 |
| Acrylic copolymer elastomer | A | B | C | D | E | F | G | H | I |
| Mooney viscosity of a copolymer (ML$_{1+4}$, 100° C.) | 36 | 28 | 35 | 39 | 19 | 25 | 39 | 37 | 37 |
| Mooney viscosity of a compound (ML$_{1+4}$, 100° C.) | 55 | 54 | 56 | 56 | 45 | 47 | 52 | 59 | 50 |
| Properties in normal conditions | | | | | | | | | |
| Tensile strength (kg/cm$^2$) | 110 | 100 | 105 | 115 | 100 | 115 | 110 | 80 | 100 |
| Elongation (%) | 190 | 170 | 180 | 175 | 170 | 190 | 230 | 150 | 190 |
| 100% modulus (kg/cm$^2$) | 70 | 53 | 60 | 63 | 55 | 58 | 51 | 70 | 57 |
| Hardness (JIS-A) | 67 | 65 | 64 | 69 | 63 | 64 | 66 | 73 | 66 |
| Heat resistance (175° C. × 168 hrs, degradation by air heating) | | | | | | | | | |
| Change in tensile strength (%) | −26 | −20 | −18 | −15 | −17 | −20 | −10 | −30 | −35 |
| Change in hardness (point) | +9 | +7 | +8 | +6 | +10 | +8 | +3 | +16 | +7 |
| Oil resistance (JIS, #3 oil, 150 × 7 hrs.) | | | | | | | | | |
| Change in volume (%) | +26.5 | +24.5 | +23.7 | +29.0 | +27.9 | +29.1 | +22.0 | +35.0 | +28.3 |
| Cold resistance | | | | | | | | | |
| Impact brittleness test (°C.) | −37.2 | −39.0 | −37.5 | −37.5 | −38.8 | −38.0 | −25.0 | −45.5 | −32.0 |
| Compression set (%) (150° C. × 70 hrs) | 42 | 47 | 40 | 39 | 50 | 45 | 37 | 75 | 46 |

Ex. - Example
CEx. - Comparative Example

EXAMPLES 7 to 12 and COMPARATIVE EXAMPLES 4 to 6

Using the acrylic copolymer elastomers produced in the above Examples and Comparative Examples, blends were prepared according to a blending recipe shown in Table 5. In the same way as in said Examples and Comparative Examples, the heat treatment was conducted to form vulcanizates, and said vulcanizates were measured for properties. The results are shown in Table 6.

TABLE 5
(Blending recipe)

| | (parts by weight) |
|---|---|
| Acrylic copolymer elastomer | 100 |
| Stearic acid | 1 |
| MAF carbon | 60 |
| Zinc di-n-butyldithiocarbamate | 1.5 |
| 2,4,6-Trimercapto-s-triazine | 0.5 |
| Diethylurea | 0.3 |

TABLE 6

| | (Vulcanization properties) | | | | | | | | |
|---|---|---|---|---|---|---|---|---|---|
| | Ex. 7 | Ex. 8 | Ex. 9 | Ex. 10 | Ex. 11 | Ex. 12 | CEx. 4 | CEx. 5 | CEx. 6 |
| Acrylic copolymer elastomer | A | B | C | D | E | F | G | H | I |
| Mooney viscosity of a copolymer (ML$_{1+4}$, 100° C.) | 36 | 28 | 35 | 39 | 19 | 25 | 39 | 37 | 37 |

TABLE 6-continued

| | (Vulcanization properties) | | | | | | | | |
|---|---|---|---|---|---|---|---|---|---|
| | Ex. 7 | Ex. 8 | Ex. 9 | Ex. 10 | Ex. 11 | Ex. 12 | CEx. 4 | CEx. 5 | CEx. 6 |
| Mooney viscosity of a compound (ML$_{1+4}$, 100° C.) | 53 | 53 | 52 | 52 | 50 | 49 | 48 | 56 | 48 |
| Properties in normal conditions | | | | | | | | | |
| Tensile strength (kg/cm$^2$) | 105 | 100 | 100 | 105 | 100 | 100 | 100 | 75 | 100 |
| Elongation (%) | 170 | 160 | 170 | 165 | 150 | 170 | 180 | 160 | 170 |
| 100% modulus (kg/cm$^2$) | 65 | 60 | 60 | 59 | 58 | 58 | 55 | 68 | 59 |
| Hardness (JIS-A) | 69 | 67 | 66 | 66 | 64 | 65 | 63 | 68 | 67 |
| Heat resistance (175° C. × 168 hrs, degradation by air heating) | | | | | | | | | |
| Change in tensile strength (%) | −13 | −15 | −14 | −12 | −17 | −18 | −8 | −27 | −25 |
| Change in hardness (point) | +11 | +12 | +13 | +9 | +11 | +9 | +8 | +18 | +8 |
| Oil resistance (JIS, #3 oil, 150 × 7 hrs.) | | | | | | | | | |
| Change in volume (%) | +25.3 | +24.1 | +22.9 | +28.6 | +28.2 | +29.5 | +21.2 | +36.0 | +27.3 |
| Cold resistance | | | | | | | | | |
| Impact brittleness test (°C.) | −37.2 | −39.2 | −38.0 | −37.7 | −38.8 | −37.0 | −23.0 | −43.5 | −32.4 |
| Compression set (%) (150° C. × 70 hrs) | 19 | 18 | 21 | 18 | 20 | 19 | 18 | 48 | 20 |

Ex. - Example
CEx. - Comparative Example

EXAMPLES 13 to 16 and COMPARATIVE Examples 7 to 9

Polymerization was performed as in the above Examples and Comparative Examples except that glycidyl methacrylate was used as the crosslinkable monomer as shown in Table 7. Polymerization conversion was 95 to 98%. Coagulation and recovery were carried out as in said Examples and Comparative Examples to obtain acrylic copolymer elastomers.

TABLE 7

| | (Monomer composition) | | | | | | |
|---|---|---|---|---|---|---|---|
| | Acrylic copolymer elastomer | | | | | | |
| Monomer composition | J | K | L | M | O | P | Q |
| Ethyl acrylate | — | 6.3 | — | 6.3 | 35.0 | 5.0 | 5.0 |
| Butyl acrylate | 47.1 | 37.4 | 41.1 | 37.4 | 35.0 | 25.1 | 52.0 |
| Methoxyethyl acrylate | 31.4 | 24.8 | 27.4 | 24.8 | 23.5 | 18.4 | 41.5 |
| Polyethylene glycol acrylate | 20.0*1 | 30.0*1 | 30.0*2 | 30.0*2 | 5.0*1 | 50.0*1 | — |
| Glycidyl methacrylate | 1.5 | 1.5 | 1.5 | 1.5 | 1.5 | 1.5 | 1.5 |

*1 Methoxytriethylene glycol acrylate
*2 Ethoxydiethylene glycol acrylate

Using the obtained acrylic copolymer elastomers, blends were prepared according to a blending recipe shown in Table 8. In the same way as in the above Examples and Comparative Examples, the heat treatment was conducted to form vulcanizates, and said vulcanizates were measured for properties. The results are shown in Table 9.

TABLE 8

| (Blending recipe) | |
|---|---|
| | (parts by weight) |
| Acrylic copolymer elastomer | 100 |
| Stearic acid | 1 |
| MAF carbon | 60 |
| Ammonium benzoate | 1.5 |

TABLE 9

| | (Vulcanization properties) | | | | | | |
|---|---|---|---|---|---|---|---|
| | Ex. 13 | Ex. 14 | Ex. 15 | Ex. 16 | CEx. 7 | CEx. 8 | CEx. 9 |
| Acrylic copolymer elastomer | J | K | L | M | O | P | Q |
| Mooney viscosity of a copolymer (ML$_{1+4}$, 100° C.) | 39 | 30 | 30 | 34 | 39 | 37 | 37 |
| Mooney viscosity of a compound (ML$_{1+4}$, 100° C.) | 65 | 64 | 62 | 64 | 52 | 59 | 50 |
| Properties in normal conditions | | | | | | | |
| Tensile strength (kg/cm$^2$) | 100 | 105 | 100 | 100 | 110 | 80 | 100 |
| Elongation (%) | 180 | 180 | 190 | 175 | 230 | 150 | 190 |
| 100% modulus (kg/cm$^2$) | 68 | 63 | 64 | 63 | 51 | 70 | 57 |
| Hardness (JIS-A) | 69 | 68 | 67 | 65 | 66 | 73 | 66 |
| Heat resistance (175° C. × 168 hrs, degradation by air heating) | | | | | | | |
| Change in tensile strength (%) | −16 | −15 | −18 | −17 | −10 | −30 | −35 |
| Change in hardness (point) | +8 | +7 | +7 | +8 | +3 | +16 | +7 |
| Oil resistance (JIS, #3 oil, 150 × 7 hrs.) | | | | | | | |
| Change in volume (%) | +24.5 | +25.8 | +24.5 | +27.6 | +22.0 | +35.0 | +28.3 |
| Cold resistance | | | | | | | |
| Impact brittleness test (°C.) | −38.2 | −38.0 | −37.5 | −37.0 | −25.0 | −45.5 | −32.0 |

TABLE 9-continued

| | (Vulcanization properties) | | | | | | |
|---|---|---|---|---|---|---|---|
| | Ex. 13 | Ex. 14 | Ex. 15 | Ex. 16 | CEx. 7 | CEx. 8 | CEx. 9 |
| Compression set (%) (150° C. × 70 hrs) | 25 | 26 | 26 | 28 | 37 | 75 | 46 |

Ex. - Example
CEx. - Comparative Example

EXAMPLES 17 to 20 and COMPARATIVE EXAMPLE 10

Using the acrylic copolymer elastomers J, K. L. M and Q prepared in the above Examples and Comparative Examples, blends were prepared according to a blending recipe shown in Table 10. Vulcanizates were formed under the same conditions as in said Examples and Comparative Examples, and measured for properties. The results are shown in Table 11.

TABLE 10

(Blending recipe)

| | (parts by weight) |
|---|---|
| Acrylic copolymer elastomer | 100 |
| Stearic acid | 1 |
| MAF carbon | 60 |
| Isocyanuric acid | 0.7 |
| Stearyltrimethylammonium bromide | 1.8 |
| Diphenylurea | 1.3 |

TABLE 11

| | (Vulcanization properties) | | | | |
|---|---|---|---|---|---|
| | Ex. 17 | Ex. 18 | Ex. 19 | Ex. 20 | CEx. 10 |
| Acrylic copolymer elastomer | J | K | L | M | O |
| Mooney viscosity of a copolymer (ML$_{1+4}$, 100° C.) | 33 | 30 | 30 | 34 | 39 |
| Mooney viscosity of a compound (ML$_{1+4}$, 100° C.) | 64 | 62 | 66 | 67 | 59 |
| Properties in normal conditions | | | | | |
| Tensile strength (kg/cm$^2$) | 105 | 100 | 100 | 105 | 110 |
| Elongation (%) | 190 | 185 | 185 | 170 | 185 |
| 100% modulus (kg/cm$^2$) | 65 | 70 | 68 | 65 | 68 |
| Hardness (JIS-A) | 67 | 68 | 65 | 66 | 69 |
| Heat resistance (175° C. × 168 hrs, degradation by air heating) | | | | | |
| Change in tensile strength (%) | −5 | −6 | −3 | −6 | −7 |
| Change in hardness (point) | +9 | +9 | +8 | +9 | +8 |
| Oil resistance (JIS, #3 oil, 150 × 7 hrs.) | | | | | |
| Change in volume (%) | +22.5 | +23.6 | +23.6 | +24.8 | +22.6 |
| Cold resistance | | | | | |
| Impact brittleness test (°C.) | −37.2 | −37.2 | −37.1 | −36.7 | −32.1 |
| Compression set (%) (150° C. × 70 hrs) | 17 | 18 | 15 | 18 | 17 |

Ex. - Example
CEx. - Comparative Example

From Tables 4, 6, 9 and 11, it follows that the vulcanizates of the acrylic copolymer elastomers in this invention are improved in cold resistance without impairing heat resistance, oil resistance and ozone resistance inherent in vulcanizates of acrylic polymers and are excellent in balance between oil resistance and cold resistance.

What we claim is:

1. An acrylic copolymer elastomer vulcanizable composition comprising:

an acrylic copolymer elastomer obtained by copolymerizing (a) 45 to 89.9% by weight of a monomer represented by the formula $$CH_2=CH-\underset{\underset{O}{\|}}{C}-O-R^1 \quad (1)$$

wherein R$^1$ denotes an alkyl group having 1 to 8 carbon atoms, and/or a monomer represented by the formula $$CH_2=CH-\underset{\underset{O}{\|}}{C}-O-R^2-O-R^3 \quad (2)$$

wherein R$^2$ denotes an alkylene group having 1 to 8 carbon atoms, and R$^3$ denotes an alkyl group having 1 to 8 carbon atoms, (b) 10 to 45% by weight of a monomer represented by the formula $$CH_2=\underset{\underset{O}{\|}}{\overset{R^4}{\underset{|}{C}}}-C-O-(C_nH_{2n}O)_mR^5 \quad (3)$$

wherein R$^4$ denotes a hydrogen atom or a methyl group, R$^5$ denotes a hydrocarbon group having 1 to 8 carbon atoms, m is an integer of 2 to 10, and n is an integer of 2 to 3, (c) 0.1 to 10% by weight of a crosslinkable monomer, and (d) 0 to 30% by weight of a monoethylenically unsaturated monomer copolymerizable with components (a), (b) and (c), said elastomer having Mooney viscosity (ML$_{1+4}$, 100°) of 10 to 100;

a vulcanizing agent; and a vulcanizing agent auxiliary.

2. A rubber member for use in a seal which is obtained by heat-molding the vulcanizable composition of claim 1.

3. A rubber member for use in a hose which is obtained by heat-molding the vulcanizable composition of claim 1.

4. A rubber member for use in a gasket which is obtained by heat-molding the vulcanizable composition of claim 1.

5. The vulcanizable composition of claim 1, wherein said monomer (b) is present in an amount of 10 to 35% by weight.

* * * * *